(12) United States Patent
Griffin et al.

(10) Patent No.: US 8,112,708 B2
(45) Date of Patent: Feb. 7, 2012

(54) PREDICTIVE TEXT DICTIONARY POPULATION

(75) Inventors: Jason Griffin, Kitchener (CA); Frank M. Tyneski, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 1630 days.

(21) Appl. No.: 11/080,444

(22) Filed: Mar. 16, 2005

(65) Prior Publication Data

US 2005/0283725 A1   Dec. 22, 2005

Related U.S. Application Data

(63) Continuation of application No. 10/870,035, filed on Jun. 18, 2004, now abandoned.

(51) Int. Cl.
*G06F 17/21* (2006.01)
*G06F 17/27* (2006.01)

(52) U.S. Cl. ........ 715/256; 715/257; 715/259; 715/260; 715/261

(58) Field of Classification Search .................. 715/532, 715/534, 256, 257, 259–261, 700; 455/456.1
See application file for complete search history.

(56) References Cited

U.S. PATENT DOCUMENTS

| | | | | |
|---|---|---|---|---|
| 5,875,443 | A * | 2/1999 | Nielsen | 707/2 |
| 5,898,836 | A * | 4/1999 | Freivald et al. | 709/218 |
| 2002/0095621 | A1 * | 7/2002 | Lawton | 714/36 |
| 2002/0126097 | A1 | 9/2002 | Savolainen | |
| 2002/0143655 | A1 * | 10/2002 | Elston et al. | 705/26 |
| 2003/0038735 | A1 * | 2/2003 | Blumberg | 341/22 |
| 2003/0104839 | A1 * | 6/2003 | Kraft et al. | 455/566 |
| 2003/0119561 | A1 * | 6/2003 | Hatch et al. | 455/566 |
| 2004/0030540 | A1 * | 2/2004 | Ovil et al. | 704/1 |
| 2004/0043758 | A1 | 3/2004 | Sorvari et al. | |
| 2004/0102197 | A1 * | 5/2004 | Dietz | 455/456.1 |
| 2004/0203900 | A1 * | 10/2004 | Cedervall et al. | 455/456.1 |

OTHER PUBLICATIONS

James Cutler, Charles Fraleigh,Devendra Jaisinghani,Dora Karali and Emre Kiciman: LUDDIDE—Location and User Dependent Information Delivery, Stanford University, Aug. 3, 2001, pp. 1-9, XP002323372, CA, USA.
Anonymous: "T9 Dictionaries for subcultures" HALFBAKERY.COM, Oct. 14, 2003, p. 1, XP002323373.
James Cutler, Charles Fraleigh, Devendra Jaisinghani, Dora Karali and Emre Kiciman: "LUDDIDE—Location and User Dependent Information Delivery" Stanford University, Aug. 3, 2001, p. 1-9, XP002323372.
Office Action, dated Mar. 10, 2010, mailed by Canadian Intellectual Property Office, in counterpart Canadian Patent Application No. 2,510,217 (3 pages).

* cited by examiner

*Primary Examiner* — Stephen Hong
*Assistant Examiner* — Wilson Tsui
(74) *Attorney, Agent, or Firm* — Finnegan, Henderson, Farabow, Garrett & Dunner, LLP (57) ABSTRACT

A method and system for populating a predictive text dictionary is provided. A connection between a handheld electronic device and a network is detected. The handheld electronic device is operable to allow a user to enter text. The handheld electronic device has a predictive text dictionary that is operable to receive and employ sets of words. User preferences for the handheld electronic device are retrieved. The predictive text dictionary of the handheld electronic device is populated with a set of words at least partially based on the user preferences.

20 Claims, 5 Drawing Sheets

PREDICTIVE TEXT DICTIONARY POPULATION

CROSS REFERENCE TO RELATED APPLICATION

This application is a continuation of U.S. patent application Ser. No. 10/870,035 filed on Jun. 18, 2004 now abandoned, the entire contents of which are incorporated herein.

FIELD OF THE INVENTION

The invention relates generally to computing device input interfaces and, more specifically, relates to a method and system for facilitating text entry.

BACKGROUND OF THE INVENTION

Text entry methods and systems for computing devices are well-known in the art. While some computing devices, such as personal computers, have been afforded with a full QWERTY keyboard for alphanumeric text entry, many other computing devices, such as handheld electronic devices, are equipped with limited keyboards, wherein one key can represent more than one alphabetic character. One such system, referred to in the art as multi-tap, has been in use for a number of years for permitting users to enter text using a conventional telephone key pad such as specified under ITU E 1.161. Multi-tap requires a user to press a key a varying number of times, generally within a limited period of time, to input a specific letter.

Another system, T9® developed by Tegic Communications, Inc., uses predictive letter patterns to allow a user to ideally press each key representing a letter only once to enter text. Unlike multi-tap, which requires a user to indicate a desired character by a precise number of presses of a key, or keystrokes, T9 uses a predictive text dictionary and established letter patterns for a language to intelligently guess which one of many characters represented by a key a user intended to enter. The predictive text dictionary is primarily a list of words, acronyms, abbreviations, etc. that can be used in the composition of text. Generally, all possible character string permutations represented by a number of keystrokes entered by a user are compared to the words in the predictive text dictionary and a subset of the permutations is shown to the user to allow selection of the intended character string. The permutations are generally sorted by likelihood determined from the number of words matched in the predictive text dictionary and various metrics maintained for these words. Where the possible character string permutations do not match any words in the predictive text dictionary, the set of established letter patterns for a selected language can be applied to suggest the most likely character string permutations. As can be conceived, a user may be required to input a number of additional keystrokes in order to enter in a desired word.

Despite the plethora of these and other interfaces available for inputting text on such computing devices, the ease and speed of text entry may not be satisfactory in some circumstances. The predictive text dictionary may be populated with words unlikely to be used by a user and may not contain other words more likely to be used by that user. As a result, the user may, upon entry of a set of keystrokes, be presented with a list of character strings that correspond to words that the user does not intend to input. Further, character strings corresponding to words the user intends to input may not appear in the suggestions provided by the device.

Such predictive text dictionaries have been used on personal computers and, more recently, on computing devices with limited keyboards, to suggest a number of words to the user upon partial entry of the word. On a personal computer, the word fragment entered by a user in a software application is compared to words in a predictive text dictionary to determine a list of words matching the pattern of letters provided by the word fragment. The list of words is then provided to the user as a list of options from which the user can select. Where the word being entered by the user does not appear in the list of words displayed, the user can elect to continue entering in text to complete the word. In computing devices with limited keyboards using systems where one keystroke can represent a number of characters, such as T9, this function is little different than the determination of the character strings to show the user, as, in this case, whole words beginning with characters possibly represented by the keystrokes entered are shown to the user.

The provisioning of predictive text dictionaries on some computing devices with limited non-volatile memory has proven to be a challenge. As a result, manufacturers have been forced to equip such devices with a pared-down predictive text dictionary, thus reducing the words available. On the other hand, large, generic predictive text dictionaries can be disadvantageous as a large number of words, many of which may not be relevant to or used by the user, can be suggested by the predictive text dictionary upon entering in a number of keystrokes. This situation serves to frustrate and slow down the user's input of text, and even can result in the insertion of the incorrect words.

Some computing devices permit a user to populate the predictive text dictionary with words provided by the user, thus increasing the utility of the predictive text dictionary if placed therein. This method of expanding the predictive text dictionary, however, is slow and typically needs to be repeated for each device of the user.

It is, therefore, an object of the invention to provide a novel method and system for populating a predictive text dictionary.

SUMMARY OF THE INVENTION

By populating a predictive text dictionary of a computing device based on user preferences, the predictive text dictionary can be populated with words that are relevant to the interests, needs, location, etc. of the user. In this manner, the words suggested to the user using the predictive text dictionary may be more likely to match a user's intended input.

Further, by not placing words that bear little relevance to the user in the dictionary, the suggestions provided to the user from the predictive text dictionary are likely to be more relevant to the user's intended input.

The maintenance of sets of words related to various interests, professions, locations, etc. allows a predictive text dictionary to be quickly populated with words relevant to the user. Also, where a user maintains more than one such computing device, or replaces one computing device with another, the invention provides a simple method of populating the predictive text dictionary of the new computing device(s) that does not require the user to spend an undue amount of time entering the words into the dictionary himself.

By maintaining a database of words related to various interests, professions, locations, etc., and using the words in the database to populate the predictive text dictionary of a user's computing device, words can be prospectively placed into the dictionary for later use by the user.

BRIEF DESCRIPTION OF THE DRAWINGS

Certain embodiments of the invention will now be described, by way of example only, with reference to the attached Figures, wherein.

DETAILED DESCRIPTION OF THE INVENTION

Figure 1:
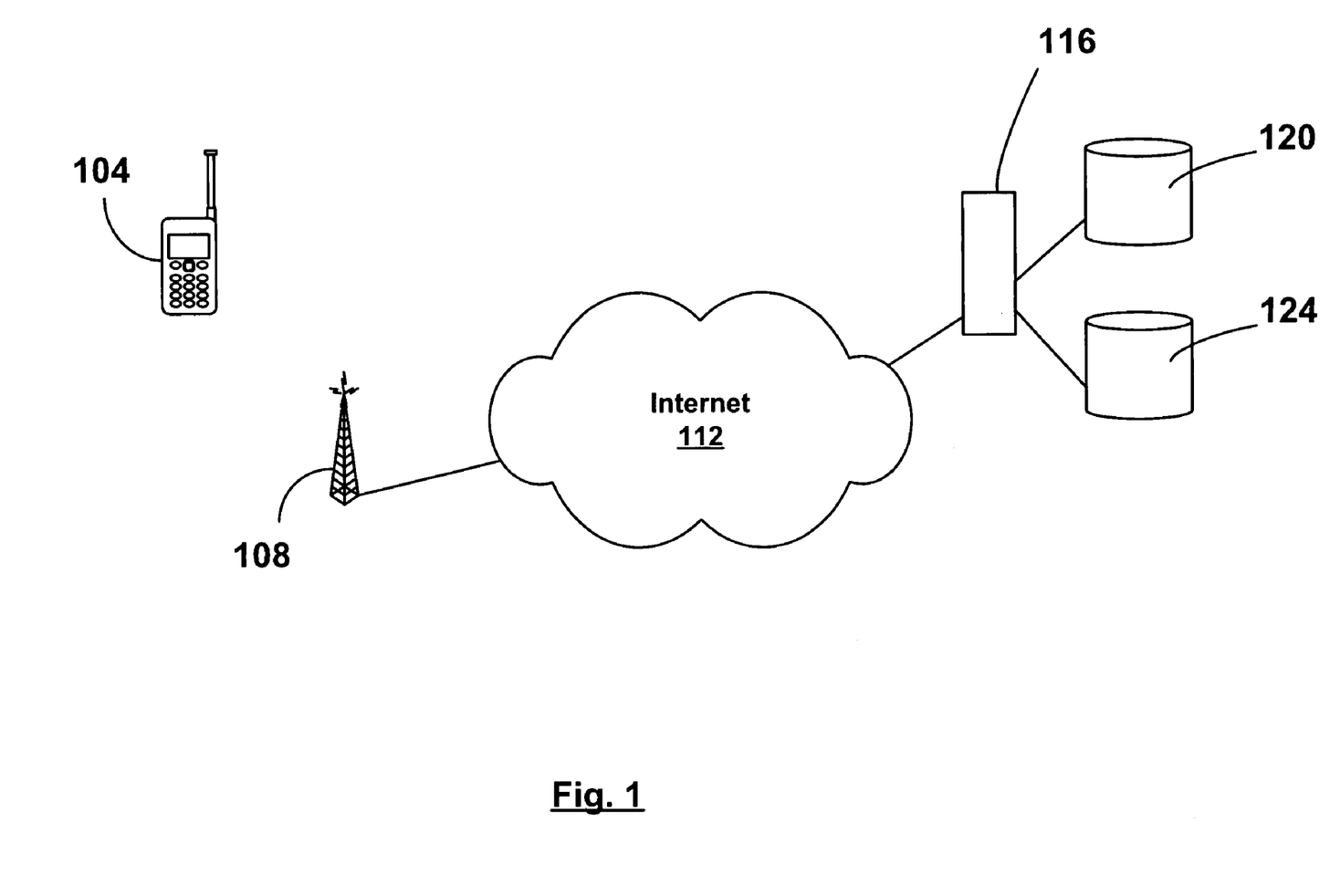
FIG. 1 shows a topological view of a number of components of the invention.

FIG. 1 is a schematic diagram of a number of components in accordance with an embodiment of the invention. A mobile computing device 104 is shown in communication via radio frequency to a cell tower 108, which is, in turn, connected to the Internet 112 via some wireless network infrastructure (not shown). A server 116 is also connected to the Internet 112, and is additionally coupled to a word database 120 and a user database 124.

The word database 120 stores a plurality of words that correspond to a number of categories and/or locations, and a number of other metrics corresponding to each word. A word as used herein refers to a word, an acronym, an abbreviation, a phrase, etc. employed by users to communicate. For example, the words "football", "NFL", "Superbowl", "touchdown", "referee" and "ref" could be associated with a "Sports" category. Additionally, some words in the word database 120 are related to locations, such as cities. For example, the words "Washington", "D.C.", "President", "White House" and "Smithsonian" and "Pennsylvania Avenue" could be associated with the city of Washington, D.C.

Words can be added to or deleted from the word database 120. For example, where a user has selected the "Sports" category, the rise of a new star NFL football player could cause his name to be added to the category. In an embodiment, the player's name is added, along with the date.

The user database 124 stores user preferences for each user including the currently selected categories, the date the categories were last updated, the date that the computing device was last updated, the last detected location of the computing device, and the date since which the computing device has been at that location.

The server 116 executes a user manager that is operable to retrieve user preferences from the user database 124, a query module to retrieve words corresponding to the user preferences from the word database 120, and a communications module to communicate the retrieved words to the computing device 104.

Figure 2:
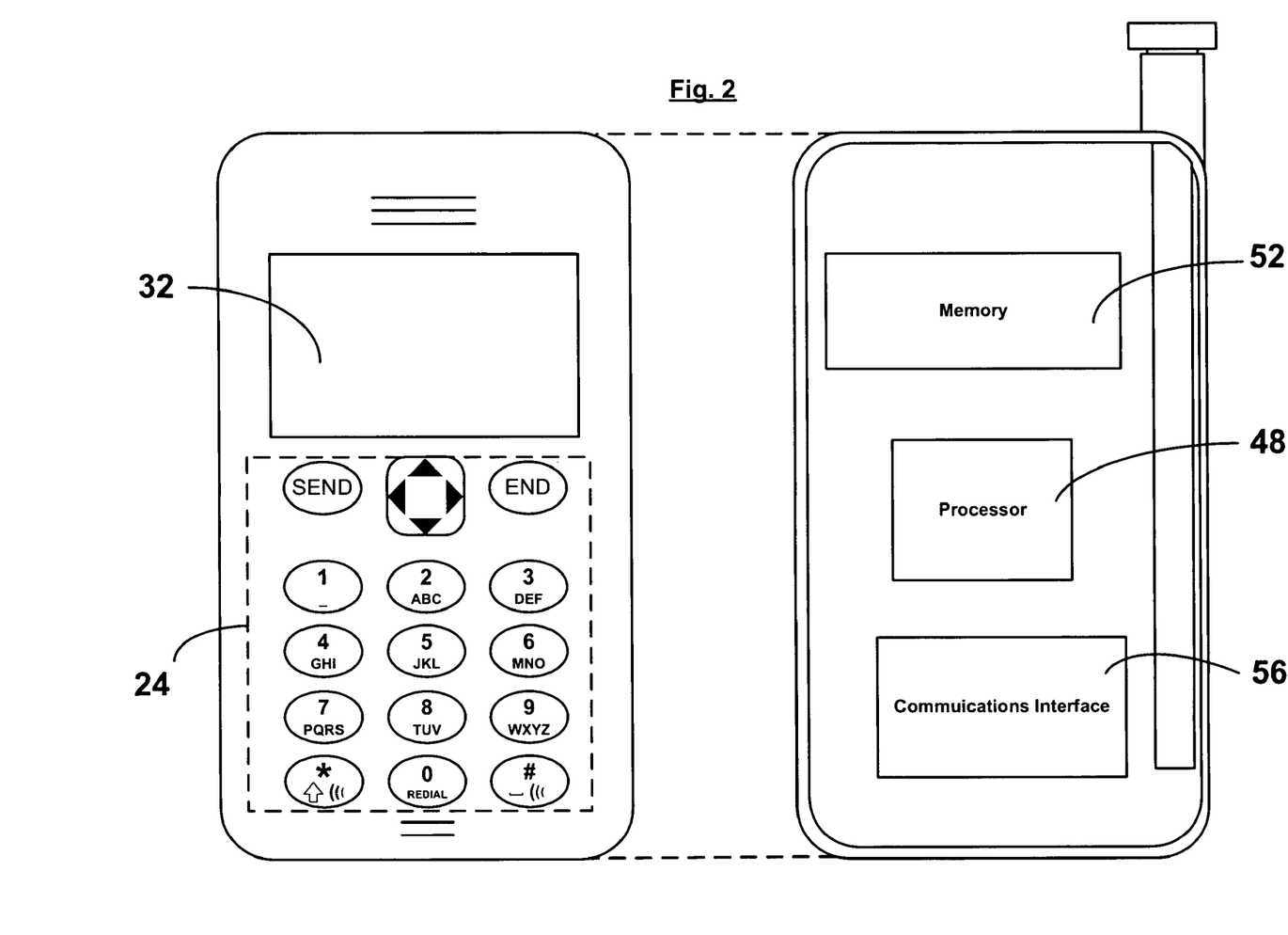
FIG. 2 shows an exploded view of a cellphone.

FIG. 2 shows an exploded view of a mobile computing device 104 having a text input interface 24, a display 32, a processor 48, memory 52 and at least one communications interface 56. The text input interface 24 comprises a set of keys via which a user can input text. The display 32 allows the user to view the inputted text and any options provided to the user. The memory 52 comprises non-volatile memory in which an operating system, applications and persistent data are stored, and volatile memory to provide adequate temporary memory registers for the applications and operating system to use during execution. The processor 48 executes the operating system and applications.

The communications interface 56 of the mobile computing device 104 is comprised of a wireless radio and antenna and is operable to communicate with the cell tower 128.

The mobile computing device 104 executes any of a number of applications, such as a Wireless Application Protocol (WAP) browser, an email application, a Short Message Service (SMS) application, a notes application, etc.

In addition, the mobile computing device 104 executes a predictive text application for receiving keystrokes from a user, determining what character strings the keystrokes can represent, and comparing the character strings to words in a predictive text dictionary maintained in non-volatile memory. The predictive text dictionary is a list of words maintained by the computing device 104. The predictive text dictionary maintains the categories and locations (if any) to which each word is associated.

Metrics can also be stored in the predictive text dictionary by the predictive text application. The metrics can correspond to the number of times each word is actively selected by the user of the computing device. Additionally or alternatively, the metrics can correspond to the number of times each word is used by the user, or is even present in a document, email, etc. received by the user. A number of non-user-specific metrics can also be stored in the predictive text dictionary, including general likelihoods used to determine priority between two words not previously used by a user. Further, a number of words in the predictive text dictionary that are intended to be permanently located in the dictionary can be marked as such using the metrics.

Figure 3:
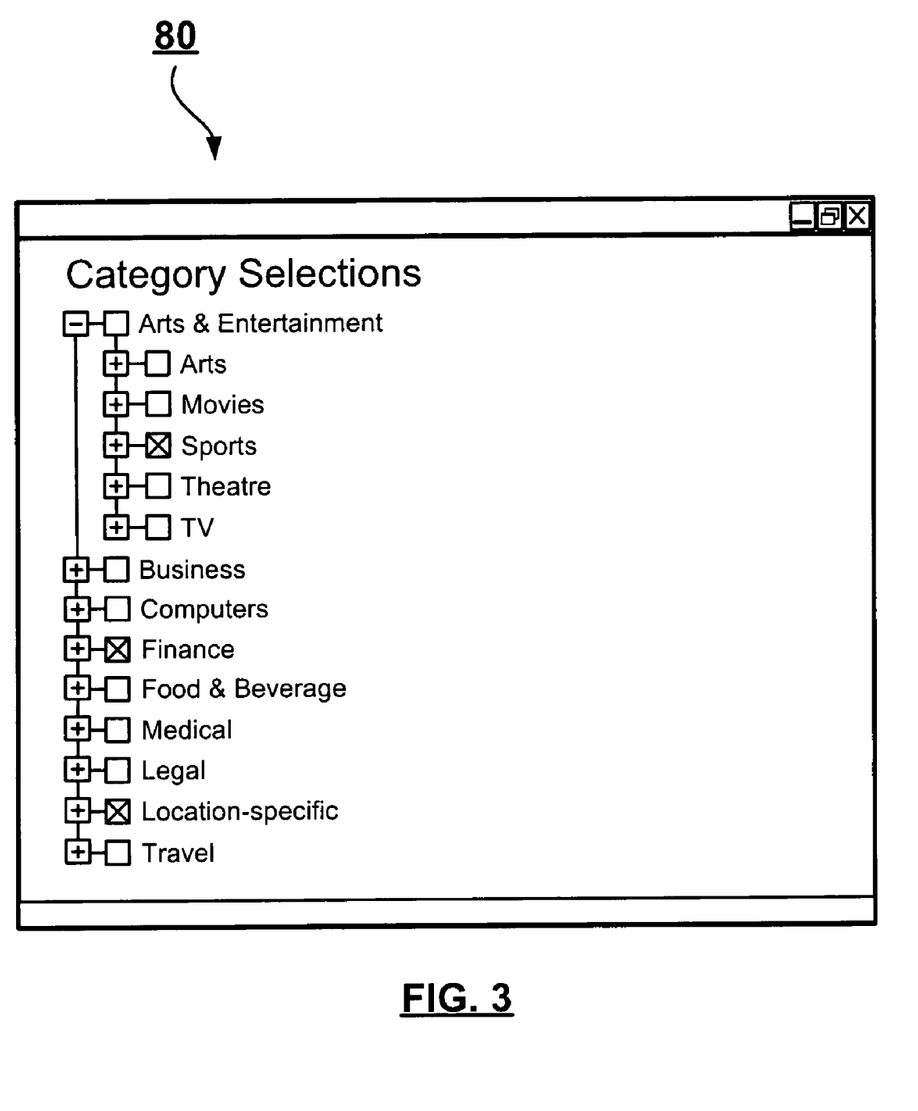
FIG. 3 shows an exemplary user interface for selecting categories and options for use in the invention.

FIG. 3 shows an exemplary user interface 80 for allowing a user to select which categories are relevant to the user. The user interface 80 can be provided via a web page, a client application or the like. In order to change preferences, the user launches the user interface 80 and selects or deselects the categories he deems as relevant. The "Sports", "Finance" and "Location-specific" categories are shown as being selected.

Figure 4:
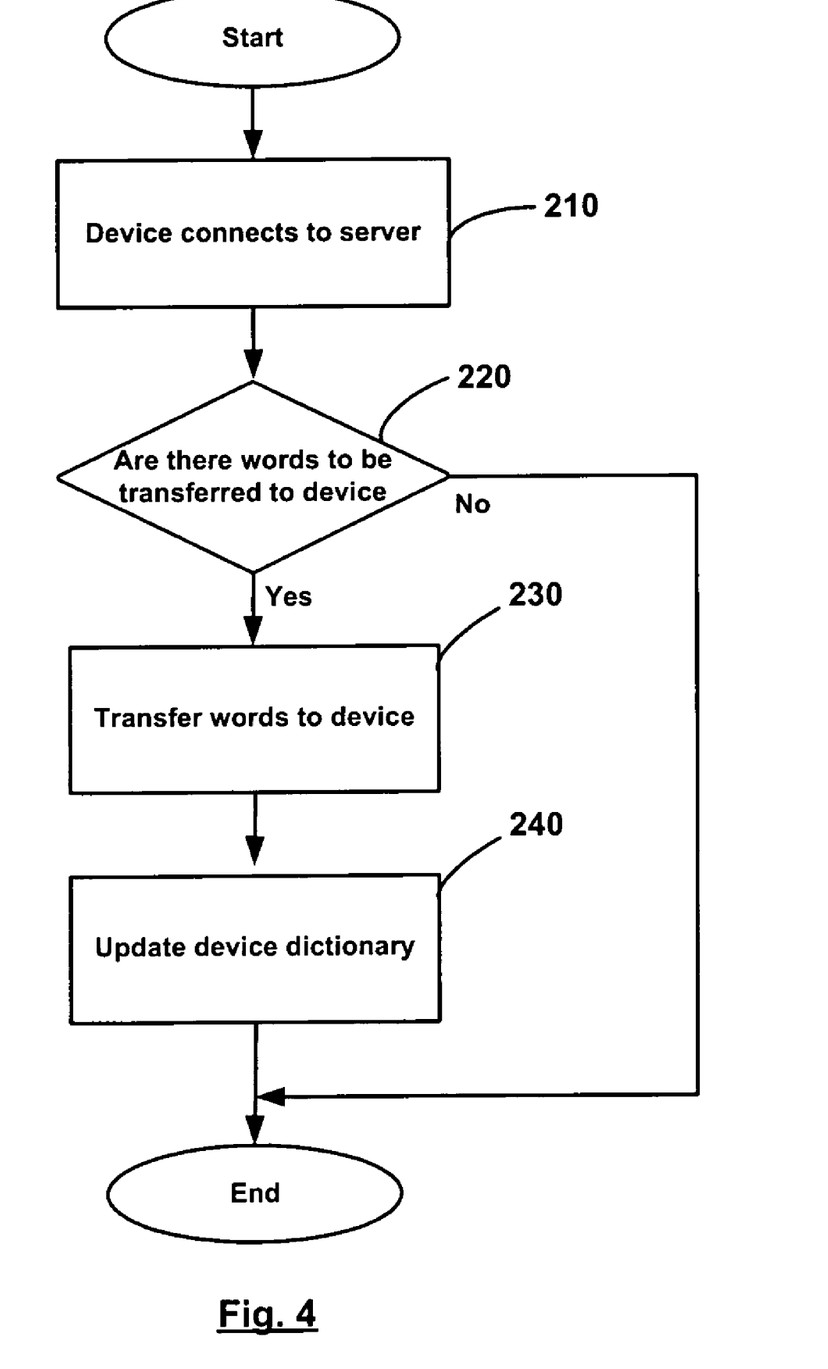
FIG. 4 illustrates a method of updating a computing device's predictive text dictionary.

The general updating of the predictive text dictionary on the computing device 104 is shown in FIG. 4. In an embodiment, this process occurs once per day and every time the device or its communication interface 56 is turned on. If the communication interface 56 of computing device 104 was turned off and is then turned on, such as is done when a user of the computing device boards and disembarks from an airplane, the device 104 registers itself with the cell tower 108. At step 210, upon registration with the cell tower 108, the computing device 104 makes a request to the server 116 for any words to be received. The request is sent to the cell tower 108, which, in turn, forwards the request to the server 116 over the Internet 112. The request received by the server 116 includes information regarding the identity of the computing device 104 and the location of the cell tower 108.

At step 220, the server 116 determines if there are words to be transferred to the computing device 104. The user manager executing on the server 116 retrieves the user preferences from the user database 124 and determines what queries will need to be run on the word database 120.

Figure 5:
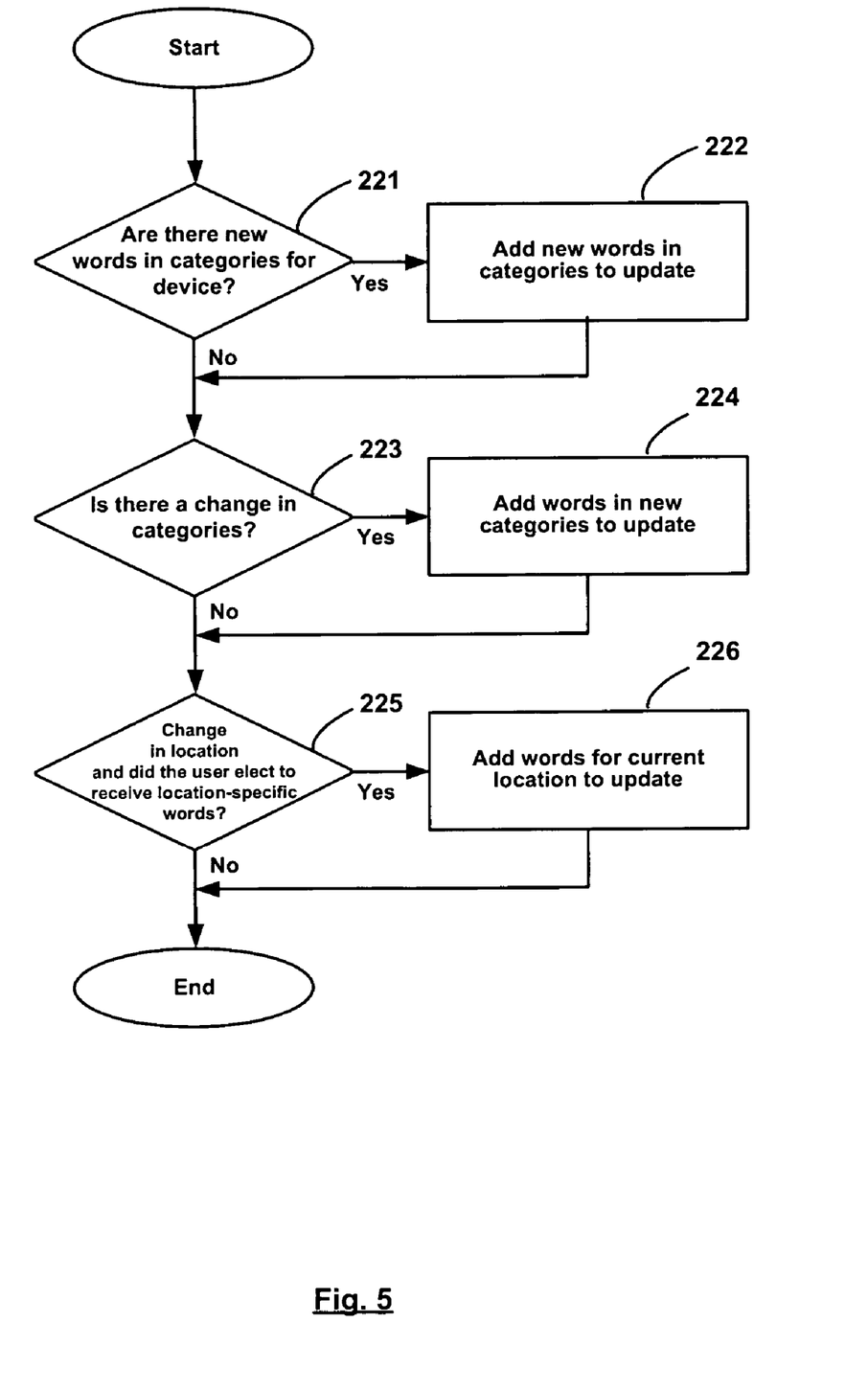
FIG. 5 illustrates a method of creating an update for a computing device's predictive text dictionary.

FIG. 5 shows the method of determining if there are words to be transferred to the computing device 104. At step 221, it is determined whether there are any new words in the word database 120 corresponding to the existing categories a user has selected. For example, where a user has selected the "Sports" category, and the addition of a new NFL football player's name to the word database occurred after the computing device's last update, the player's name could be flagged for transfer to the device at step 222.

At step 223, it is determined whether the user has selected new categories. At step 224, the words corresponding to the new categories are added to the list of words to be transferred to the computing device 104. Then, at step 225, it is determined whether the computing device is in a new location and whether the user preferences indicate that the user selected to receive location-specific words. If the answer to both questions is yes, the words associated with the new location in the word database 120 are added to the list of words to be transferred to the computing device 104 at step 226.

While the flow chart of FIG. 5 shows three distinct groups of words being determined, those of skill in the art will appreciate that there may be overlap between the three groups and that the determination of the words to be transferred can typically be performed with a single query. The single query is formulated by the query module of the server 116 and made of the word database 120. The word database 120, in turn, returns a set of words that correspond to at least one of the three steps 231, 233 and 235 above.

Returning to FIG. 4, the method proceeds to step 230, where the list of words is transferred to the computing device 104 by the server 116. In the implementation being described, the words are transferred via a proprietary protocol. Upon receipt of the words, the device updates the predictive text dictionary by appending the words to the dictionary. The method of updating the computing device is then complete.

It can be desirable to remove words from the predictive text dictionary of the computing device 104 for a number of reasons. Where the computing device may have limited memory, words can be removed from the predictive text dictionary by examining the metrics associated with each word and discarding those words with the lowest values determined by a function of those metrics. The predictive text dictionary may also be pared-down by the user or system operator in recognition that over-population of the dictionary with words that are not likely to be used can lead to poor suggestions being provided to the user upon entering a number of keystrokes. In the current implementation, this is performed in two ways.

When a user selects to remove a category from his user preferences via the user interface 80, the server 116 can transmit this information to the computing device 104. In response, the computing device can purge some or all of the words associated only with the removed category. Where a word in the predictive text dictionary associated with the category to be removed has been used by the user according to the metrics maintained by the dictionary, the word can be left in the dictionary.

Further, when a user has selected to receive location-specific words, and has brought the computing device 104 to a new location, the server can direct the computing device to purge all of the words associated with a prior location from the predictive text dictionary. Where a word in the predictive text dictionary associated with the previous location to be removed has been used by the user according to the metrics maintained by the dictionary, the word can be left in the dictionary.

While the invention has been described with specificity to mobile devices, other types of computing devices with which the invention can be used will occur to those of skill in the art. For example, a personal computer can benefit from the invention, as the predictive text dictionary of an application executing thereon could be populated with words relevant to the interests, profession, etc. of the user of the personal computer to provide for enhanced word completion capabilities. Further, where the computing device is a wireless device that occasionally connects to a networked computer via a cable or other local networking means such as WiFi or Bluetooth, the invention can benefit from reduced rates for data communications via landline by connecting to the server at least partially exclusively through the networked computer.

While the illustrated embodiment discusses the use of user options, these user options may be implicit or provided in some other manner. For example, upon subscribing to a wireless access service, a user may be asked if he would like to receive location-specific information. The computing device he receives can be preconfigured to always receive location-specific words upon detection that he is in a different location.

The user can be provided the option of updating the predictive text dictionary for a location to which the computing device has yet to go. This can be advantageous where a user is preparing for a business trip.

Words in the word database can be selected to correspond to a specific category and location at the same time. As a result, the predictive text dictionary of a computing device may only be updated with the appropriate words when a user of the device selected the appropriate category and is in the specific location.

The server can be a cluster of servers in a single location or can be two or more servers situated in a number of locations.

Where a computing device is memory-restricted, the server can selectively forward words to the computing device. Also, the computing device can delete a group of words from the predictive text dictionary to allow for newer words. Also, the words can be forwarded to the computing device via other means of communication apart from a proprietary protocol, such as email, MMS, WAP push and the like.

While the location of the computing device is determined by determining which cell tower the computing device is connected through, other methods of locating the computing device known to those skilled in the art can be used. For example, the computing device can, in some circumstances, be located by determining the node on the Internet closest to the cell tower, generally associated with a wireless gateway for the cellular service provider. Cellular triangulation can also be used. Further, if the computing device is equipped with a GPS receiver, the device can communicate the GPS-received location along with the request for new words.

The words provided to the computing device for population of its predictive text dictionary can be set to expire after a period of time and/or period of non-use. This could be advantageous with current event items. In such a case, the server can selectively retransmit a word previously transmitted to a computing device if it is believed the word will be used again. Additionally, location-specific words could be set to expire upon relocation of the computing device.

The user database can alternatively reside either on the computing device and be transmitted to the server when requesting updates or can reside on a computer associated with the computing device.

Additionally, the words can be provided to the computing device by other means. For example, the words can be placed on a subscriber identity module ("SIM") card which are incorporated in the predictive text dictionary upon insertion of the SIM card and initialization of the computing device or predictive text application thereon. Other methods will occur to those skilled in the art.

The above-described embodiments of the invention are intended to be examples of the invention and alterations and modifications may be effected thereto, by those of skill in the art, without departing from the scope of the invention which is defined solely by the claims appended hereto.

What is claimed is:

1. A method of populating a predictive text dictionary of a handheld electronic device, comprising:

detecting a connection between said handheld electronic device and a server, said handheld electronic device having a predictive text dictionary and being operable to allow a user to enter text and to receive and place words in said predictive text dictionary;

the server in response to the detecting retrieving user preferences corresponding to a list of word categories for said handheld electronic device;

the server selecting a set of words from a word database at least partially based on said user preferences; and the server providing said set of words to said handheld electronic device for placement in said predictive text dictionary, said set of words being at least partially based on said user preferences.

2. A method of populating a predictive text dictionary according to claim 1, further comprising:

determining whether a modification has been made to said user preferences, and wherein said set of words selected from said word database corresponds to said modification.

3. A method of populating a predictive text dictionary according to claim 1, wherein subsets of the words in said word database are associated with each of said categories.

4. A method of populating a predictive text dictionary according to claim 3, further comprising:

determining whether a modification has been made to said subsets of the words in said word database associated with said user preferences, and wherein said set of words selected from the words in said word database corresponds to said modification.

5. A method of populating a predictive text dictionary according to claim 1, further comprising:

discarding at least one of the words in said predictive text dictionary of said handheld electronic device.

6. A method of populating a predictive text dictionary according to claim 5, further comprising:

determining said at least one of the words in said predictive text dictionary based on usage by said user.

7. A method of populating a predictive text dictionary according to claim 5, further comprising:

determining said at least one of said words in said predictive text dictionary based on an expiry date associated with the words.

8. A system for populating a predictive text dictionary on a handheld electronic device, the handheld device having an updateable predictive text dictionary, the system comprising:

electronic memory storing a word database of words associated with a list of word categories;

a server executing a user manager for retrieving user preferences of a user of said handheld electronic device corresponding to said categories;

electronic memory storing a user database for storing said user preferences;

a query module on the server for retrieving a subset of said words from said word database at least partially based on said user preferences; and a communications module for communicating said at least one of said words to said handheld electronic device for inclusion in said predictive text dictionary.

9. A system for populating a predictive text dictionary according to claim 8, wherein said user preferences are selected by said user.

10. A system for populating a predictive text dictionary according to claim 8, wherein said subset of said words from said word database is selected by said query module has not been previously communicated to said handheld electronic device.

11. A system for populating a predictive text dictionary according to claim 10, wherein said user database is also operable to store historical user preferences.

12. A system for populating a predictive text dictionary according to claim 8, wherein said word database is also operable to store effective dates for each of said words.

13. A method of populating a predictive text dictionary, comprising:

a server detecting a location of a handheld electronic device operable to allow a user to enter text, said handheld electronic device having a predictive text dictionary and being operable to repeatedly receive and place words in said predictive text dictionary;

the server providing said handheld electronic device with a set of words specific to said location of said handheld electronic device for placement in said predictive text dictionary.

14. A method of populating a predictive text dictionary according to claim 13, wherein said handheld electronic device is a wireless handheld electronic device and said detecting is comprised of:

determining a wireless gateway with which said handheld electronic device is associated.

15. A method of populating a predictive text dictionary according to claim 13, wherein said handheld electronic device is capable of cellular communications and said detecting is comprised of determining a cellular tower with which said handheld electronic device is in communication.

16. A method of populating a predictive text dictionary according to claim 13, wherein said handheld electronic device is capable of cellular communications and said detecting is comprised of:

determining said location of said handheld electronic device based on cellular triangulation.

17. A method of populating a predictive text dictionary according to claim 13, wherein said handheld electronic device has a GPS receiver and said detecting is comprised of:

determining a latitude and a longitude for said handheld electronic device.

18. A method of populating a predictive text dictionary according to claim 13, further comprising:

comparing said location of said handheld electronic device to a previous location of said handheld electronic device to determine said set of words.

19. A method of populating a predictive text dictionary according to claim 18, wherein said comparing further comprises:

retrieving a previous location of said handheld electronic device from a user data base.

20. A method of populating a predictive text dictionary according to claim 13, further comprising:

directing said handheld electronic device to discard at least one word in said predictive text dictionary associated with a previous location.

* * * * *

UNITED STATES PATENT AND TRADEMARK OFFICE
CERTIFICATE OF CORRECTION

PATENT NO. : 8,112,708 B2
APPLICATION NO. : 11/080444
DATED : February 7, 2012
INVENTOR(S) : Jason Griffin et al.

It is certified that error appears in the above-identified patent and that said Letters Patent is hereby corrected as shown below:

IN THE DRAWINGS:

In Fig. 2, block 56, "Commuications" should read --Communications--.

IN THE SPECIFICATION:

In column 5, line 3, after "computing device", insert --104--.

In column 5, line 17, "steps 231, 233 and 235" should read --steps 221, 223 and 225--.

In column 5, line 27, after "computing device", insert --104--.

In column 5, line 41, after "computing device", insert --104--.

In column 8, claim 10, line 6, "database is selected" should read --database that is selected--.

In column 8, claim 19, line 55, "data base." should read --database.--.

Signed and Sealed this
Twenty-fourth Day of April, 2012

David J. Kappos
*Director of the United States Patent and Trademark Office*